US012773932B2

(12) United States Patent
Johansson et al.

(10) Patent No.: US 12,773,932 B2
(45) Date of Patent: Oct. 27, 2026

(54) ADJUSTABLE CONNECTING BAR FOR CHILD SAFETY SEAT IN VEHICLE AND CHILD SAFETY SEAT

(71) Applicant: Holmbergs Safety System Holding AB, Halmstad (SE)

(72) Inventors: Simon Johansson, Halmstad (SE); Rickard Bengtsson, Halmstad (SE)

(73) Assignee: Holmbergs Safety System Holding AB, Halmstad (SE)

( * ) Notice: Subject to any disclaimer, the term of this patent is extended or adjusted under 35 U.S.C. 154(b) by 130 days.

(21) Appl. No.: 18/870,976

(22) PCT Filed: Apr. 17, 2023

(86) PCT No.: PCT/EP2023/059892
§ 371 (c)(1),
(2) Date: Dec. 2, 2024

(87) PCT Pub. No.: WO2023/232338
PCT Pub. Date: Dec. 7, 2023

(65) Prior Publication Data

US 2025/0368100 A1 Dec. 4, 2025

(30) Foreign Application Priority Data

Jun. 3, 2022 (SE) .................................... 2250678-6

(51) Int. Cl.
*B60N 2/28* (2006.01)
*B60N 2/015* (2006.01)

(52) U.S. Cl.
CPC .................................. *B60N 2/2887* (2013.01)

(58) Field of Classification Search
CPC .. B60N 2/2887; B60N 2/2821; B60N 2/2893; B60N 2/2812; B60N 2/265;

(Continued)

(56) References Cited

U.S. PATENT DOCUMENTS

| | | | | |
|---|---|---|---|---|
| 8,454,089 B2 * | 6/2013 | Nett | ..................... | B60N 2/2887 297/253 |
| 10,589,645 B2 * | 3/2020 | Lagunar Herranz | ... | B60R 11/00 |
| 2020/0017003 A1 | 1/2020 | Persson | | |

FOREIGN PATENT DOCUMENTS

| | | |
|---|---|---|
| CN | 105644397 A | 6/2016 |
| CN | 110920481 A | 3/2020 |

(Continued)

OTHER PUBLICATIONS

European Patent Office; International Search Report issued in counterpart PCT/EP2023/059892. Date of Report: Jun. 30, 2023.

(Continued)

*Primary Examiner* — Shin H Kim
(74) *Attorney, Agent, or Firm* — Dykema Gossett PLLC

(57) ABSTRACT

The invention relates to an adjustable connecting bar (100, 100') for releasable fastening of a child safety seat (400) to a vehicle seat (502) having fixedly mounted anchoring members (504). The connecting bar (100, 100') comprises: a coupling device (104) transformable between a locked configuration and a release configuration, a first elongated bar member (112) extending along a longitudinal axis between a first distal end (**108*a*) provided with the coupling device (104) and a first proximal end (108*b*), a second elongated bar member (130) extending along a longitudinal axis between a second distal end (132*a*) and a second proximal end (132*b*), wherein the first and second elongated bar members (112, 130) are telescopically interconnected and arranged for relative displacement via one or more intermediate positions between a retracted end position and an extended end position of the connecting bar (100, 100'), wherein the first elongated bar member (112) comprises an actuation member (116) movably arranged relative the first elongated bar member (112) along the longitudinal axis of the first elongated bar member (112**), wherein the connect- (Continued)

ing bar (100, 100') further comprises a latch (124) being rotatably connected to the first elongated bar member (112), wherein the latch (124), in a first state, is configured to prevent both extension and retraction of the connecting bar (100, 100'), wherein the latch (124), in a second state, is configured to prevent extension and allow retraction of the connecting bar (100, 100'), and wherein the latch (124), in a third state, is configured to allow both extension and retraction of the connecting bar (100, 100'). The invention further relates to an adjustable mounting arrangement and a child safety seat.

20 Claims, 9 Drawing Sheets

(58) Field of Classification Search
CPC ... B60N 2/2875; B60N 2/269; A44B 11/2503; B60R 22/10; B60R 22/105; B60R 19/023; B60R 21/2072
See application file for complete search history.

(56) References Cited

FOREIGN PATENT DOCUMENTS

| | | | |
|---|---|---|---|
| EP | 0619201 | A | 10/1994 |
| EP | 0703113 | A2 | 3/1996 |
| EP | 2551150 | B1 | 12/2016 |
| WO | 2012172001 | A1 | 12/2012 |

OTHER PUBLICATIONS

European Patent Office; Written Opinion of the ISA issued in counterpart PCT/EP2023/059892. Date of Report: Jun. 30, 2023.

* cited by examiner

ADJUSTABLE CONNECTING BAR FOR CHILD SAFETY SEAT IN VEHICLE AND CHILD SAFETY SEAT

TECHNICAL FIELD

The invention relates to an adjustable connecting bar and an adjustable mounting arrangement for releasable fastening of a child safety seat to a vehicle seat, and a child safety seat arranged for releasable fastening to a vehicle seat.

BACKGROUND ART

It is standard practice to secure a child restraint system using releasable "alligator-like" connectors, which are rigidly coupled to the vehicle seat, to fixedly mounted generally U-shaped rod-like anchoring members normally available at the bottom of the backrest of a passenger vehicle seat. ISOFIX systems are standardized in the international standard ISO 13216 that specifies this type of anchoring system for child restraint systems. Examples of this type of connector are given in EP 0619201 and EP 0703113.

Child safety seats, also referred to as child restraint systems, are connected using ISOFIX systems and include cushioned seat shells having seat and back portions, booster cushions with or without side bolsters, and baby carriers. Child safety seats may be integral or may include a seat/booster/baby carrier mounted on a chassis (also called base) which is connected using an ISOFIX system. The connectors may be arranged to be retractable between a use position, where the connectors are projecting from the child safety seat, and a stowed position, where the connectors are withdrawn and at least partly enclosed in the child safety seat.

The connection between the child safety seat and the vehicle seat must be as firm and rigid as possible. It is also desirable to provide for adjustment to varying vehicle seat inclinations, dimensions and shapes in order to ensure safe and secure mounting of the child safety seat.

EP 2551150 relates to a child safety seat assembly including a base with two connector arms which are movable back and forth to extend from and retract into the base. An adjustment mechanism includes a manually operable release actuating assembly disposed between the two connector arms and two latches arranged to lock or unlock the connector arms to the base. The child safety seat assembly is further described to include a driving mechanism operable to actuate the latching hook of a locking fastener provided on each connector arm in order to engage or disengage the anchorage bracket of the vehicle. The driving mechanism includes a manually operable fastener release actuator operatively connected with a linking bar, which in turn is connected with the latching hook.

WO 2012/172001 relates to a base, to which a child safety seat can be releasably connected. The base comprises a floor support device, Isofix connectors and a support surface for the child safety seat. The base further comprises a fastening and adjustment mechanism for the child safety seat and the Isofix connectors. The fastening and adjustment mechanism comprises a first handle that is connected to and cooperating with at least one hook and an indicator device and a second handle being connected to a locking device.

Normally, mounting systems for child vehicle seats, adjustment of the length by which the connectors protrude from the child safety seat is accomplished by a manually operable mechanism. Thus, there is a need for a more user-friendly and convenient system in order to facilitate and ensure safe mounting of portable child safety seats in vehicles. Moreover, in many of the hitherto known mounting systems the adjustment mechanism is separate from the connectors, often arranged between the connectors, and takes up a great deal of space. Moreover, the mounting system is generally integrated in a chassis on which the child safety seat is placed.

In view of the above, there is a need for a space efficient operating mechanism by which a user may operate a connector.

SUMMARY OF THE INVENTION

It is an objective of the present invention to mitigate, alleviate or eliminate one or more of the above-identified deficiencies in the art and disadvantages singly or in any combination and solve at least the above-mentioned problems.

According to a first aspect of the invention, these and other objects, and/or advantages that will be apparent from the following description of embodiments, are achieved, in full or at least in part, by an adjustable connecting bar for releasable fastening of a child safety seat to a vehicle seat having fixedly mounted anchoring members. The connecting bar comprises: a coupling device transformable between a locked configuration and a release configuration, a first elongated bar member extending along a longitudinal axis between a first distal end provided with the coupling device and a first proximal end, a second elongated bar member extending along a longitudinal axis between a second distal end and a second proximal end, wherein the first and second elongated bar members are telescopically interconnected and arranged for relative displacement via one or more intermediate positions between a retracted end position and an extended end position of the connecting bar, wherein the first elongated bar member comprises an actuation member movably arranged relative the first elongated bar member along the longitudinal axis of the first elongated bar member, wherein the connecting bar further comprises a latch being rotatably connected to the first elongated bar member, wherein the latch, in a first state, is configured to prevent both extension and retraction of the connecting bar, wherein the latch, in a second state, is configured to prevent extension and allow retraction of the connecting bar, and wherein the latch, in a third state, is configured to allow both extension and retraction of the connecting bar.

By the wording "adjustable" as in "adjustable connecting bar", it is herein meant that the connecting bar may be length-wise adjusted.

By the wording "retracted end position", it is herein meant a configuration where the connecting bar is in its shortest form, i.e. fully retracted. In contrast, by the wording "extended end position", it is hereby meant a configuration where the connecting bar is in its longest form, i.e. fully extended.

The first state may be an unlocked state. By the first state, the length of the connection bar (i.e. the relative displacement between the first and second elongated bar members) is fixed. Having the connecting bar fixed in the first state may be advantageous when the connecting bar is to be attached to the anchoring member of the vehicle seat. Preferably, the connecting bar is in the extended end position for ease of installation. The second state may be a locked state. In the second state the coupling device may be in the locked configuration and attached to the anchoring member of the vehicle seat. Further, the latch, in the second state, may allow retraction of the connecting bar for adjusting the length of the connecting bar after it has been successfully attached to the vehicle seat. The third state may be a release state. In the third state the connecting bar is allowed to be both retracted and extended. Further, the coupling device may be transformed into the release configuration.

A simplified construction of the connecting bar may be achieved by having the single latch controlling the three different states of the connecting bar. In other words, full manipulation of the connecting bar (i.e. locking/unlocking and/or adjustment of its length) may be managed by the single latch. This further allows for both an improved user interaction, and a compact and material effective construction.

The second elongated bar member may comprise an aperture, and the latch may be configured to engage with the aperture.

The connecting bar may comprise a plurality of apertures distributed along the longitudinal axis of the second elongated bar member, and the latch may be configured to engage with any one of the plurality of apertures. Each intermediate position of the first and second elongated bar members may be defined by the latch engaging with each aperture of the plurality of apertures. By having a plurality of apertures, more intermediate positions of the connecting bar can be achieved.

The latch may be biased by a spring to engage with the aperture(s). This may simplify installation and adjustment of the connecting bar.

The actuation member may further comprise a pin element arranged at a third proximal end.

The latch, in the first state, may be in engagement with the aperture, and may be prevented from rotating by the pin element of the actuation member. The latch, in the second state, may be in engagement with the aperture but free to rotate in one direction. The latch, in the third state, may be in engagement with the pin element of the actuation member.

The coupling device may comprise a hook member being rotatably connected to the first elongated bar member to thereby be transformable between the locked configuration and the release configuration, wherein the hook member may be spring biased towards the release configuration.

The actuation member may further comprise a locking element, arranged at a third distal end, and may be configured to lock the coupling device in the locked configuration by engagement with the hook member.

The latch may comprise a protruding top part having a substantially straight side and a ramp side.

The actuation member may further comprise a first protruding member for manually operating the actuation member.

The connecting bar may further comprise a second protruding member fixedly connected to the first elongated bar member, and a distance between the second protruding member and the first distal end of the first elongated member may be shorter than a distance between the first protruding member and the first distal end of the first elongated member.

The arrangement of the second protruding member in relation to the first protruding member may be advantageous in that it prevents unwanted movement of the first protruding member (and thus movement of the actuation member which thereby could cause the connecting bar to release from the vehicle seat) in case of a crash. For example, in case the latch would break due to a force pulling the first and second elongated bar members apart, the second protruding member may act as a safety stop, preventing the connecting bar from extending any further. In addition to preventing the first and second elongated bar members from separating altogether, it also prevents the first protruding member from being engaged, as described above.

The connecting bar may further comprise an indicator mechanism operatively connected to the coupling device to indicate a transformation between the locked configuration and the release configuration. This may be advantageous in that in gives the user an indication of whether the connecting bar is successfully installed or not, thereby improving installation process.

According to a second aspect of the invention, these and other objects are achieved, in full or at least in part, by an adjustable mounting arrangement for releasable fastening of a child safety seat to a vehicle seat having fixedly mounted anchoring members. The adjustable mounting arrangement comprises a pair of adjustable connecting bars, wherein each adjustable connecting bar is an adjustable connecting bar according to the first aspect described above.

According to a third aspect of the invention, these and other objects are achieved, in full or at least in part, by a child safety seat arranged for releasable fastening to a vehicle seat, the child safety seat comprising an adjustable mounting arrangement according to the second aspect described above.

Effects and features of the second and third aspects of the present invention are largely analogous to those described above in connection with the first aspect of the inventive concept. Embodiments mentioned in relation to the first aspect of the present invention are largely compatible with the further aspects of the invention. In order to avoid undue repetition, reference is made to the above.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

An adjustable connecting bar for releasable fastening of a child safety seat to a vehicle seat will now be described with reference to FIG. 1A to FIG. 5.

Figure 1A:
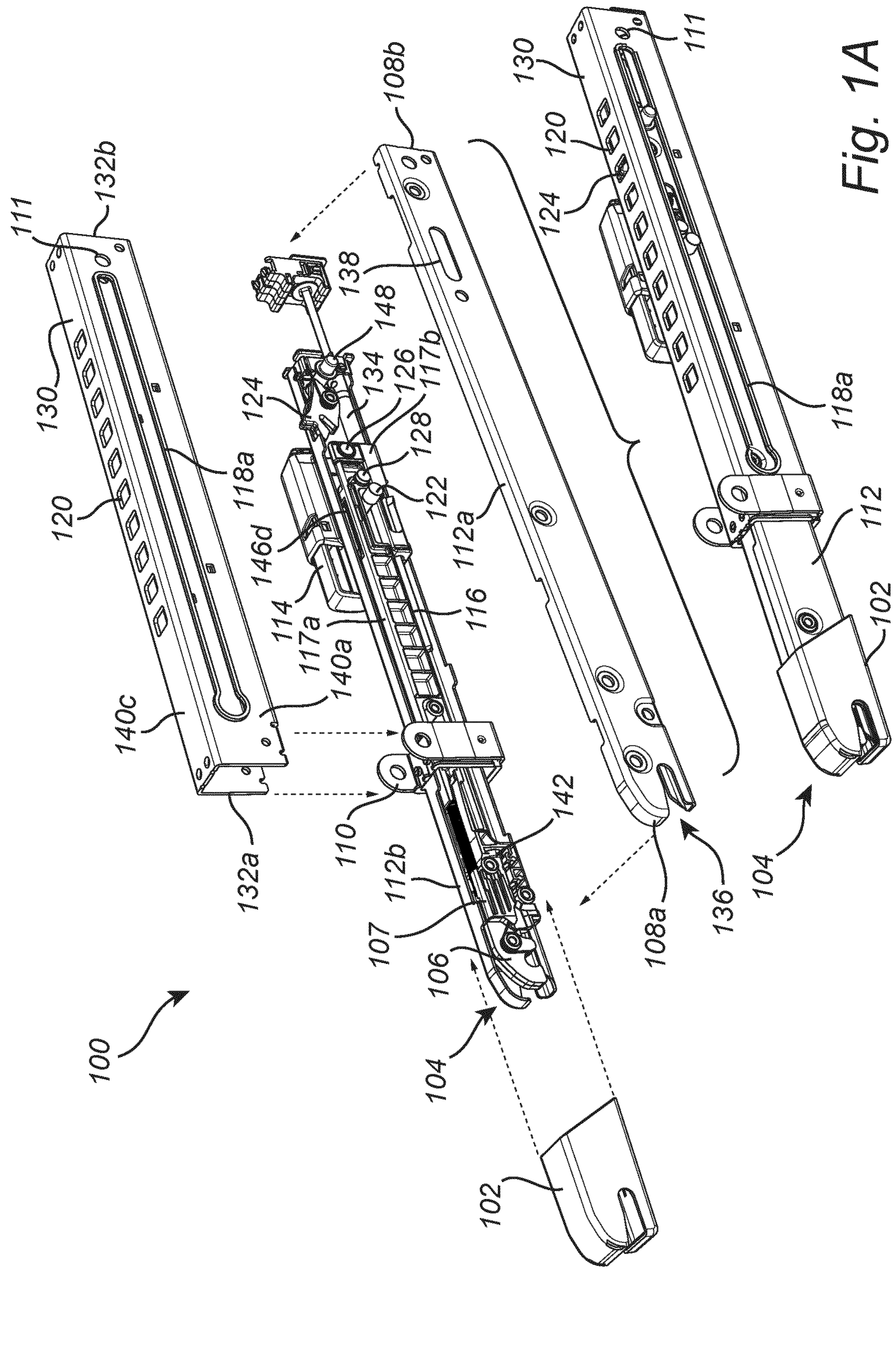
FIGS. 1A and 1B are perspective views of an exemplary embodiment of an adjustable connecting bar for releasable fastening of a child safety seat to a vehicle seat according to a first aspect of the invention.
Figure 1B:
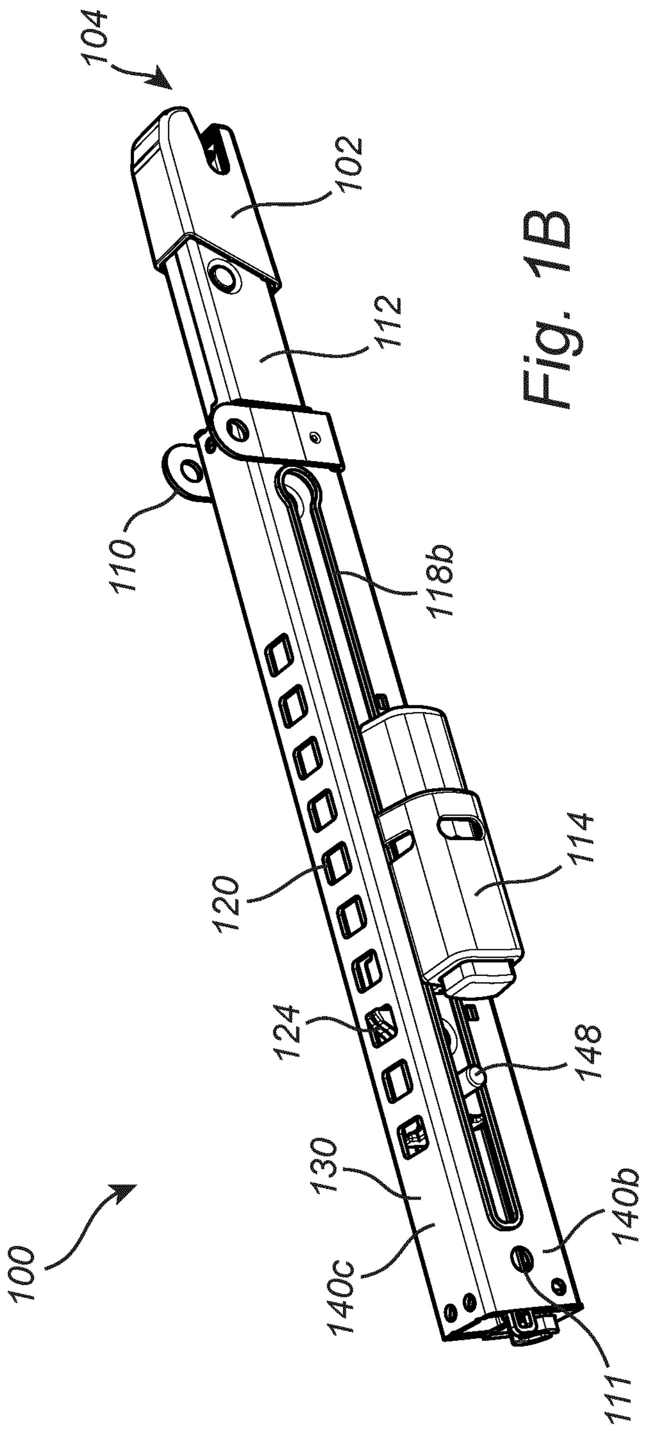

FIG. 1A illustrates an exemplary embodiment of the adjustable connecting bar 100 for releasable fastening of a child safety seat 400 to a vehicle seat 502. The connecting bar 100 is herein illustrated in a perspective view, both in an assembled and an exploded view. FIG. 1B illustrates the same exemplary embodiment of the adjustable connecting bar 100, but in another perspective view (namely from an opposite side). It should be noted that shapes, sizes or relative dimensions of the different parts of the connecting bar 100 are merely an illustrative example, and should not be seen as limiting the scope of the present inventive concept.

The adjustable connecting bar 100 comprises a coupling device 104. The coupling device 104 may be an ISOFIX connector. The coupling device 104 is transformable between a locked configuration and a release configuration. The coupling device 104 may be configured to connect to fixedly mounted anchoring members 504 of the vehicle seat 502. In the locked configuration, the coupling device 104 may be securely attached to the anchoring members 504 of the vehicle seat 502. In the release configuration, the coupling device 104 may be able to be removed from the anchoring members 504, or connected thereto. The coupling device 104 may comprise a hook member 106 as illustrated herein. The hook member 106 may hook to the anchoring members 504 of the vehicle seat 502. The hook member 106 may be rotatably connected to a first elongated bar member 112 of the connecting bar 100 to thereby be transformable between the locked configuration and the release configuration. The hook member 106 may be spring biased towards the release configuration. In other words, when the hook member 106 is not engaged by any other part of the connecting bar 100 or any external forces, the coupling device 104 may be in the release configuration. This may assist in installation of the connecting bar 100, since no motion of the user is required to keep the coupling device 104 in the release configuration. The function of the coupling device 104 is further discussed below in connection with FIG. 2A to 2C.

As stated above, the adjustable connecting bar 100 further comprises a first elongated bar member 112. The first elongated bar member 112 extends along a longitudinal axis between a first distal end 108*a* and a first proximal end 108*b*. The longitudinal axis of the first elongated bar member 112 may be a first longitudinal axis. The coupling device 104 may be provided at the first distal end 108*a*. Thus, the first distal end 108*a* may be the end of the first elongated bar member 112 arranged towards the anchoring members 504 of the vehicle seat 502 when mounted thereto. The first elongated bar member 112 may comprise of a first side portion 112*a* and a second side portion 112*b*. The first elongated bar member 112 may further comprise a first slot 136, arranged at the first distal end 108*a*, and arranged to receive the anchoring member 504 of the vehicle seat 502. The first elongated bar member 112 may further comprise a second slot 138, configured to allow a first protruding member 128 (further described below) to move along the longitudinal axis within the second slot 138.

The adjustable connecting bar 100 further comprises a second elongated bar member 130. The second elongated bar member 130 extends along a longitudinal axis between a second distal end 132*a* and a second proximal end 132*b*. The longitudinal axis of the second elongated bar member 130 may be a second longitudinal axis. The first and second longitudinal axes may be the same longitudinal axis. The first and second longitudinal axes may be parallel to each other. The second proximal end 132*b* of the second elongated bar member 130 may be the end arranged away from the anchoring members 504 of the vehicle seat 502 when mounted to the vehicle seat 502. The first and second elongated bar members 112, 130 are telescopically interconnected. In other words, one of the elongated bar members may be at least partly encased by the other and able to be pulled out or pushed in to thereby adjust the length of the connecting bar 100. In the illustrated example, the first elongated bar member 112 is arranged inside of the second elongated bar member 130. The second elongated bar member 130 comprises a first and second side wall 140*a*, 140*b*, and a top wall 140*c*. However, a bottom of the second elongated bar member 130 is open. Hence, the second elongated bar member 130 partially encloses the first elongated bar member 112. The first and second elongated bar members 112, 130 are arranged for relative displacement via one or more intermediate positions between a retracted end position and an extended end position of the connecting bar 100.

The second elongated bar member 130 may be formed by a folded sheet metal. The second elongated bar member 130 may comprise a first side wall 140*a*, a second side wall 140*b*, and a top wall 140*c*. Thus, the second elongated bar member 130 may have an open bottom. Hence the sheet metal may be folded along two lines. This may simplify production and reduce the amount of material needed. The second elongated bar member 130 may comprise a third slot 118*a* and a fourth slot 118*b* along the longitudinal direction on the first and second side wall 140*a*, 140*b* respectively. The third and fourth slot 118*a*, 118*b* may allow protruding members of an actuation member 116 (further described below) to extend through the second elongated bar member 130 and run within the slot as the connecting bar 100 is operated.

The second elongated bar member 130 may comprise at least one aperture 120. In other words, the second elongated bar member 130 may comprise one aperture 120. Alternatively, the second elongated bar member 130 may comprise a plurality of apertures 120. In the illustrated example, the second elongated bar member 130 comprises ten apertures

120. However, any number of apertures may be possible. The at least one aperture 120 may be provided on the top wall 140*c* of the second elongated bar member 130. The at least one aperture 120 may define the intermediate positions of the first elongated bar member 112 relative the second elongated bar member 130. As the skilled person realizes, the more apertures 120 the more possible intermediate positions of the connecting bar 100 may be achieved. In case the second elongated bar member 130 comprises a plurality of apertures 120, the plurality of apertures 120 may be evenly distributed along a section of the top wall 140*c* of the second elongated bar member 130 as illustrated herein. Alternatively, the apertures 120 of the plurality of apertures 120 may be unevenly distributed along the top wall 140*c* of the second elongated bar member 130. The at least one aperture 120 may have a rectangular shape as illustrated herein. However, the at least one aperture 120 may have other shapes as well, such as circular, elliptical, or any polygon shape.

The connecting bar 100 may further comprise a protective housing 102. The protective housing 102 may be provided over an end portion of the first elongated bar member 112 at the first distal end 108*a*. Hence, the protective housing 102 may be provided over the coupling device 104. The protective housing 102 may be made of any suitable material, such as plastic or metal.

The connecting bar 100, as illustrated herein, further comprises a hook guide 107. The hook guide 107 is fixedly attached to the first elongated bar member 112. The hook guide 107 may guide the hook member 106 in its rotation.

The connecting bar 100 further comprises an actuation member 116. The actuation member 116 may be part of the first elongated bar member 112. Hence, the first elongated bar member 112 may comprise the actuation member 116. More specifically, the actuation member 116 may be arranged inside the first elongated bar member 112. The actuation member 116 may be movably arranged relative the first elongated bar member 112 along the longitudinal axis of the first elongated bar member 112. In other words, the actuation member 116 may be arranged to slide along the longitudinal axis of the first elongated bar member 112. The actuation member 116 may further comprise a first protruding member 128. The first protruding member 128 may be fixedly connected to the actuation member 116. The first protruding member 128 may be arranged to allow manual operation of the actuation member 116. In other words, a displacement of the actuation member 116 relative the first elongated bar member 112 may be performed by operating the first protruding member 128. As illustrated more clearly in FIG. 2B, the first protruding member 128 may protrude outwards from a side of the actuation member 116 through the first and second elongated bar member 112, 130 and movable along the longitudinal axis of the first elongated bar member 112. The first protruding member 128 may protrude in a direction perpendicular to the longitudinal axis of the first elongated bar member 112.

The actuation member 116 may further comprise a locking element 142 arranged at a third distal end 144*a* of the actuation member 116. The third distal end 144*a* of the actuation member 116 may be the end of the actuation member 116 arranged towards the coupling device 104. The actuation member 116 may be spring biased towards the coupling device 104. Hence, the connecting bar 100 may comprise a second spring 146*b* having a first end connected to the first elongated bar member 112 and a second end connected to the actuation member 116. More specifically, the first end may be connected to the first elongated bar member 112 through the hook guide 107. In other words, the first end of the second spring 146*b* may be connected to the hook guide 107. Thus, the locking element 142 may be configured to lock the coupling device 104 in the locked configuration by engagement with the hook member 106. More specifically, when the hook member 106 is rotated to the locked configuration, the locking element 142 of the actuation member 116 may engage the hook member 106 to lock it in place. The locking element 142 and the actuation member 116 may be formed by one single part. Alternatively, the locking element 142 and the actuation member 116 may be formed by two separate parts fixedly attached to each other.

Figure 2A:
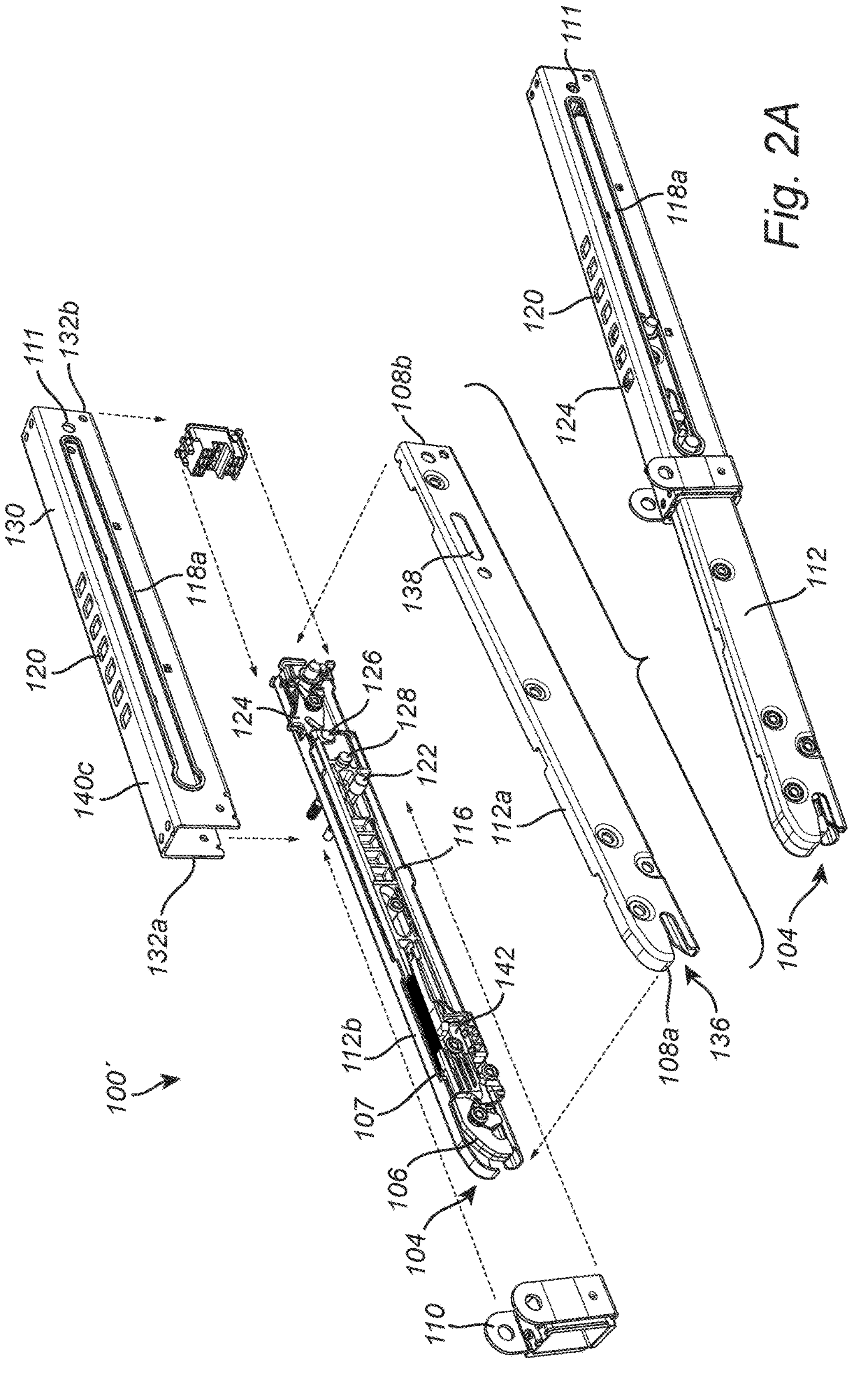
FIGS. 2A and 2B are perspective views of another exemplary embodiment of an adjustable connecting bar for releasable fastening of a child safety seat to a vehicle seat according to the first aspect of the invention.

The actuation member 116 may further comprise a pin element 126 arranged at a third proximal end 144*b* of the actuation member 116. The third proximal end 144*b* may be the end opposite to the third distal end 144*a* of the actuation member 116. The pin element 126 may be configured to engage with a latch 124 (further described below) of the connecting bar 100. The actuation member 116 may be formed by a first part 117*a* and a second part 117*b* as illustrated herein. The first part 117*a* and the second part 117*b* may be attached together by a fourth spring 146*d*. Hence, movement along the longitudinal axis of one of the first or second part 117*a*, 117*b* may also result in movement of the other part. The pin element 126 is in this example arranged at the second part 117*b*. Having the actuation member 116 formed by the first and second part 117*a*, 117*b*, linked together through the fourth spring 146*d*, may enable the implementation of an indicator mechanism 134 as is further described below. The spring connection may allow the first part 117*a* of the actuation member 116 to be moved towards the coupling device 104 to thereby lock it in the locked configuration, also in the case where the second part 117*b* may be stuck, for example due to the indicator mechanism 134 or the latch 124. Alternatively, the actuation member may be formed of a single part, as shown in FIG. 2A, for a more simplified structure.

The connecting bar 100 may further comprise a second protruding member 122. The second protruding member 122 may be fixedly connected to the first elongated bar member 112. A distance between the second protruding member 122 and the first distal end 108*a* of the first elongated bar member 112 may be shorter than a distance between the first protruding member 128 and the first distal end 108*a* of the first elongated bar member 112. In other words, the second protruding member 122 may be closer to the coupling device 104 than the first protruding member 128.

The connecting bar 100 further comprises a latch 124 being rotatably connected to the first elongated bar member 112. The latch 124 may be arranged at the first proximal end 108*b* of the first elongated bar member 112. The latch 124 may be configured to engage with the at least one aperture 120 of the second elongated bar member 130. Further, the latch 124 may be biased by a third spring 146*c* to engage with the at least one aperture 120. Thereby, the latch 124 may prevent and/or allow extension and retraction of the connecting bar 100 by engaging and/or disengaging with the aperture 120. More specifically, in a first state, the latch 124 is configured to prevent both extension and retraction of the connecting bar 100. In a second state, the latch 124 is configured to prevent extension and allow retraction of the connecting bar 100. In a third state, the latch 124 is configured to allow both extension and retraction of the connecting bar 100. The different stages are further described below in connection with FIG. 3A to 3C.

In the illustration of FIGS. 1A and 1B, the connecting bar 100 is illustrated in one of a plurality of intermediate position defined by the latch 124 being in engagement with one of the apertures 120. The retracted end position of the connecting bar 100 may be defined by a position where the latch 124 is in engagement with the aperture closest to the second proximal end 132*b* of the second elongated bar member 130. The extracted end position of the connecting bar 100 may be defined by a position where the latch 124 is in engagement with the aperture closest to the second distal end 132*a* of the second elongated bar member 130.

The connecting bar 100 illustrated in FIGS. 1A and 1B further comprises an indicator mechanism 134 operatively connected to the coupling device 104 to indicate a transformation between the locked configuration and the release configuration. More specifically, the indicator mechanism 134 may indicate to a user whether the connecting bar 100 is correctly connected to an anchoring member 504 or not, based on a position of the actuation member 116 relative to the first elongated bar member 112. The indicator mechanism 134 may provide the indication (i.e. whether the coupling device is in the locked configuration or the release configuration) to an external indicator. For example, the indication may be provided to an electronic switch which can trigger on the indication.

The connecting bar 100 may further comprise seat connection points 110, 111 configured to connect the connecting bar 100 with a child safety seat 400. Herein, the connecting bar 100 is provided with a first connection point 110 and a second connection point 111. However, the connecting bar 100 may comprise any number of connection points.

The connecting bar 100 may further comprise an unlocking mechanism 114. The unlocking mechanism 114 may be operatively connected to the first protruding member 128 to allow a user to operate the connecting bar 100 by the unlocking mechanism 114. The unlocking mechanism 114 may for example be a button or the like. The unlocking mechanism 114 may comprise an indicator which can indicate a transformation between the locked configuration and the release configuration of the coupling device 104. Thus, the indicator of the unlocking mechanism 114 may be coupled to the actuation member 116.

Figure 2B:
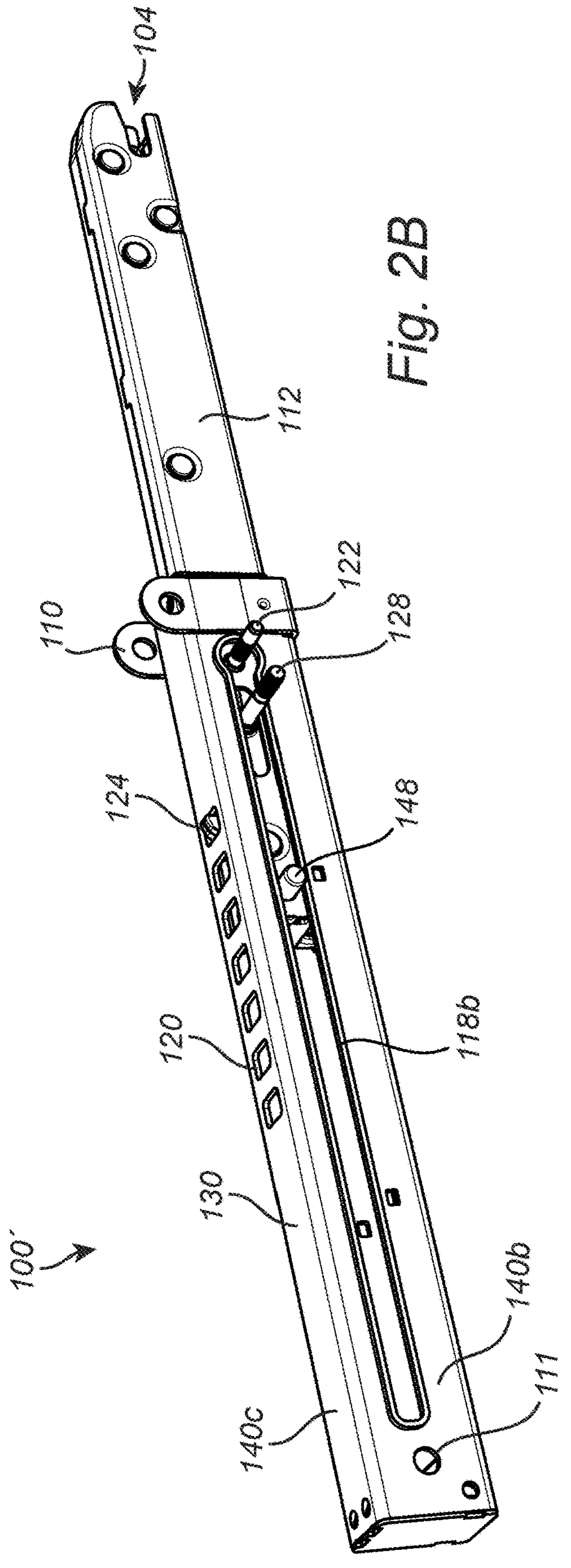

FIGS. 2A and 2B illustrates another exemplary embodiment of the adjustable connecting bar 100' for releasable fastening of a child safety seat 400 to a vehicle seat 502 according to the first aspect of the invention in two different perspective views. Any features mentioned in connection with the example in FIGS. 1A and 1B are applicable to the example in FIGS. 2A and 2B, and vice versa.

Compared to the connecting bar 100 illustrated in FIGS. 1A and 1B, the connecting bar 100' of FIGS. 2A and 2B is provided without the indicator mechanism. Hence, the example of FIGS. 2A and 2B provides a simpler construction compared to the example of FIGS. 1A and 1B.

FIGS. 2A and 2B further illustrates the connecting bar 100' in a different position than the connecting bar 100 in FIGS. 1A and 1B. The connecting bar 100' of FIGS. 2A and 2B is illustrated in the extended end position, as opposed to the connecting bar 100 of FIGS. 1A and 1B which is illustrated in one of the intermediate positions.

FIG. 2B further illustrated the first and second protruding member 122, 128. As stated above, the first protruding member 128 is connected to the actuation member 116 and may protrude through the fourth slot 118*b* of the second elongated bar member 130. The first protruding member 128 may be translated along the longitudinal axis of the first elongated bar member 112 by the user to transform the connecting bar 100' into the first, second and third state. The second protruding member 122 is fixedly attached to the first elongated bar member 112. The second protruding member 122 may protrude through the fourth slot 118*b* of the second elongated bar member 130. The second protruding member 122 may act as a safety stop e.g. in case the latch 124 or the aperture 120 fails. This may for instance be the case in the event of a crash. The fixedly mounted second protruding member 122 may then engage with an end of the fourth slot 118*b* (towards the second proximal end 132*b* of the second elongated bar member 130) to prevent the second elongated bar member 130 to separate from the first elongated bar member 112. Further, the position of the second protruding member 122 being in front of the first protruding member 128 (i.e. closer to the end of the fourth slot 118*b*), may prevent the actuation member 116 to be pushed, and thus transforming the connecting bar 100' into the release state, in case the latch 124 or aperture 120 fails. As seen In FIG. 2A, the second protruding member 122 may extend through the third slot 118*a* of the second elongated bar member 130 as well, to engage with said third slot 118*a* in case of the latch 124 or aperture 120 fails.

Similarly to the second protruding member 122, a stopping member 148 (further described below) may extend through the third and/or fourth slot 118*a*, 118*b* of the second elongated bar member 130 to act as a safety stop in case a retraction force pushes the connecting bar 100 together. The stopping member 148 may then engage with the opposite ends of the third and/or fourth slot 118*a*, 118*b*, as compared to the second protruding member 122. Further, the second protruding member 122 and the stopping member 148 may serve as guiding means for the relative displacement between the first and second elongated bar members by engaging with the third and/or fourth slot 118*a*, 118*b*. This allows a bottom of the second elongated bar member 130 to be left open, as opposed to having the second elongated bar member 130 completely enclose the first elongated bar member 112. Thereby, less material may be needed for the second elongated bar member 130.

Figure 3A:
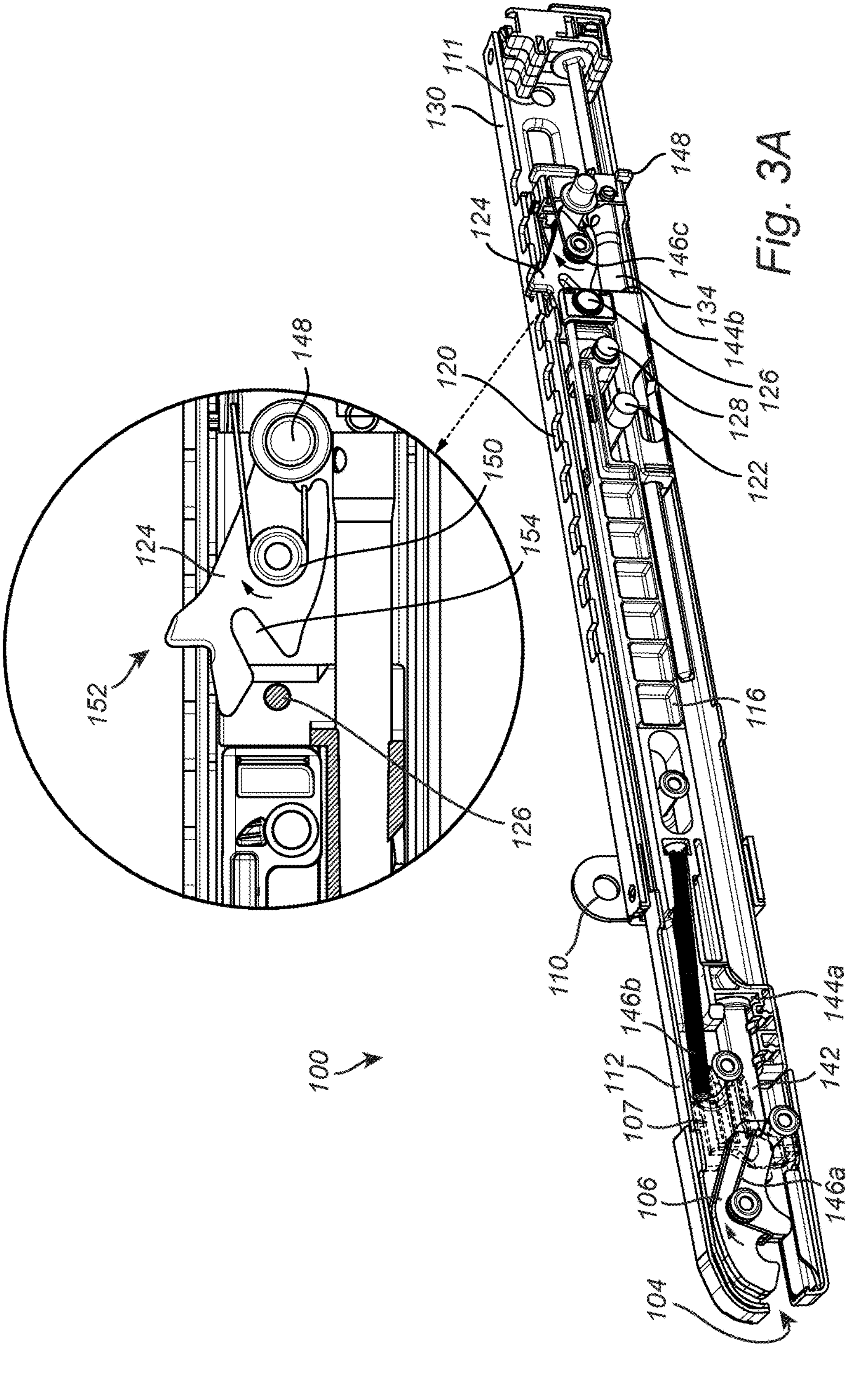
FIG. 3A is a perspective view of the adjustable connecting bar when a latch thereof is in a first state.
Figure 3B:
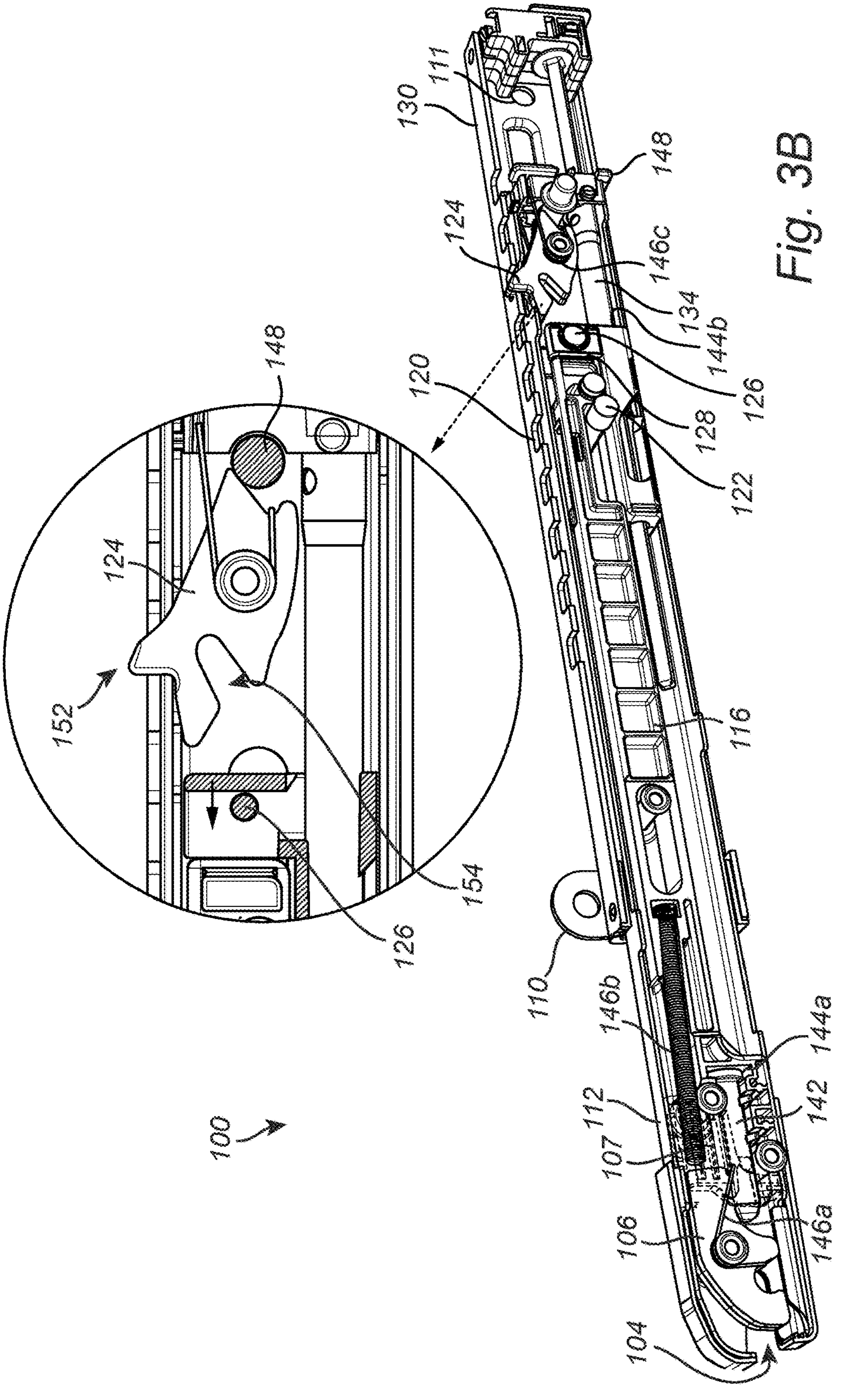
FIG. 3B is a perspective view of the adjustable connecting bar when the latch thereof is in a second state.
Figure 3C:
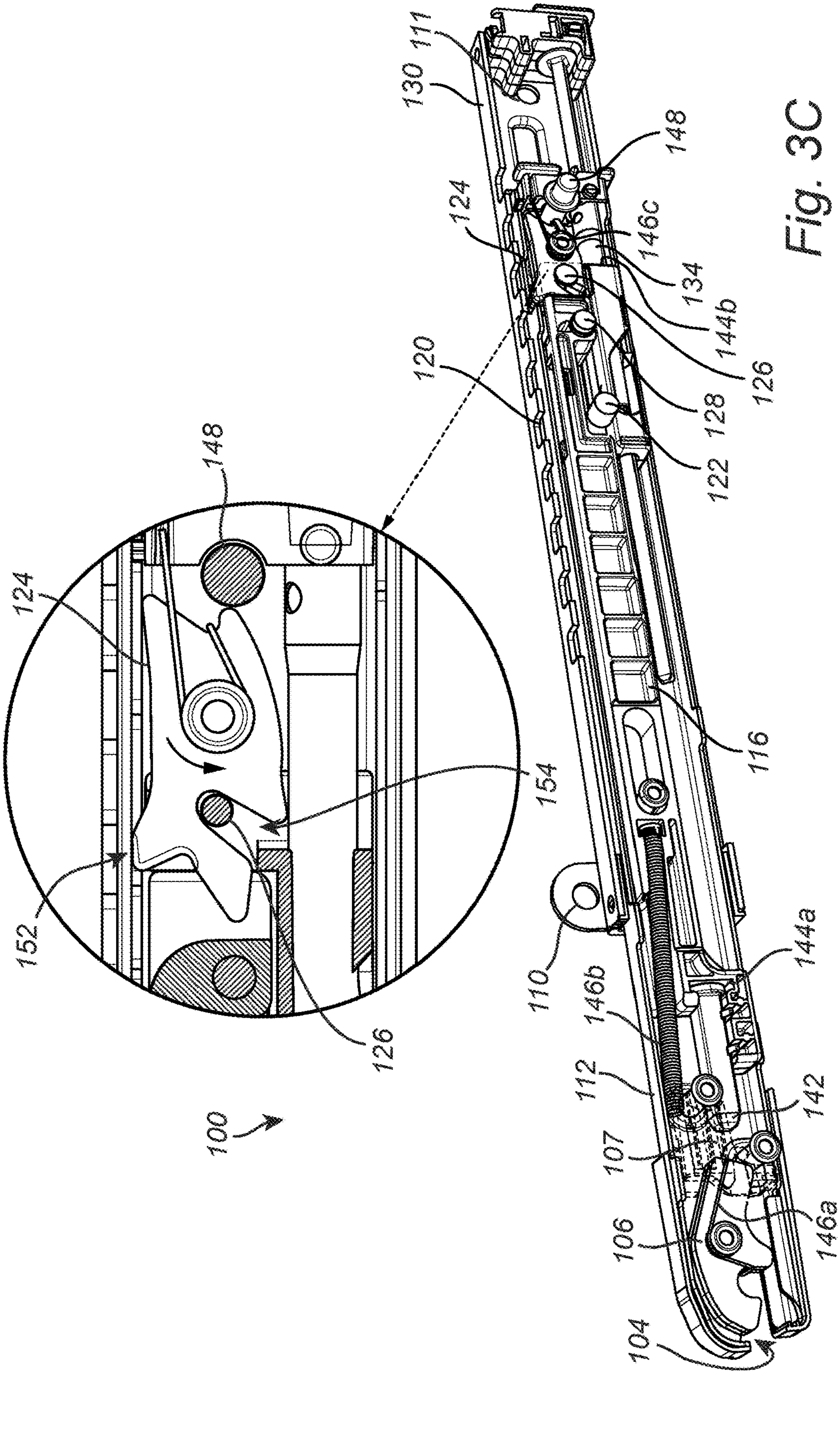
FIG. 3C is a perspective view of the adjustable connecting bar when the latch thereof is in a third state.

FIG. 3A to 3C are perspective views of the adjustable connecting bar 100 in three different states. In particular, FIG. 3A to 3C illustrates the connecting bar 100 when the latch 124 thereof is in a first, a second and a third state respectively. Even though the connecting bar 100 illustrated herein is the connecting bar 100 as illustrated in FIGS. 1A and 1B, the following discussion about the different states are representative of other embodiments of the connecting bar 100 as well, such as the exemplary embodiment of the connecting bar 100' of FIGS. 2A and 2B.

For improved understanding, a section of the connecting bar 100 showing the latch 124 is shown in a zoomed-in side-view in FIGS. 3A to 3C. Further, the hook guide 107 is illustrated in broken lines for illustrative purposes.

In FIG. 3A, the latch 124 is in the first state. The first state may also be referred to as an unlocked state. The wording “unlocked” as in “unlocked state”, refers to the coupling device 104 being in the release configuration. The first state may thus refer to the whole connecting bar 100 and just not the latch 124. As stated above, the latch 124, in the first state, is configured to prevent both extension and retraction of the connecting bar 100. In other words, the first elongated bar member 112 and the second elongated bar member 130 is prevented from moving relative each other. More specifically, the connecting bar 100 is held in the current position, either in an intermediate position, in the retracted end position or in the extended end position. This state may be advantageous in a process where a user is to attach the connecting bar 100 to an anchoring member 504 of a vehicle seat 502 since the connecting bar 100 can be handled without it being extended or retracted. In other words, when the user, by applying a force, pushes the connecting bar 100 towards the anchoring member 504 to attach the coupling device 104, the connecting bar 100 is prevented from either extending or retracting.

The arrows illustrated at the hook member 106, the locking element 142 and the latch 124 illustrates the direction of biasing. As mentioned above, the hook member of the coupling device may be biased by a first spring 146*a* towards the release configuration. The first spring 146*a* may be attached to the hook guide 107. The actuation member 116 (and thus also the locking element 142) may be biased by a second spring 146*b* towards the coupling device 104. This may allow the locking element 142 to engage the hook member 106 when the hook member 106 transforms into the locked configuration. Lastly, the latch 124 may be biased by a third spring 146*c* to engage the at least one aperture 120 of the second elongated bar member 130.

As illustrated herein, the latch 124 is rotatably connected to the first elongated bar member 112. In other words, the latch 124 may rotate around a latch attachment point 150. The latch 124 may further be biased by a third spring 146*c* to engage with the aperture(s) 120 of the second elongated bar member 130. Put differently, as seen in the side-view of FIG. 3A, the latch 124 is biased in a clockwise rotation around the latch attachment point 150. The connecting bar 100 may further comprise a stopping member 148. The stopping member 148 may be fixedly attached to the first elongated bar member 112. The stopping member 148 may provide a stopping point for the clockwise rotation of the latch 124. Put differently, the stopping member 148, when in engagement with the latch 124, defines a top end-position of the latch 124.

In the following, reference is made to "an/the aperture" to refer to the aperture 120 which the latch 124 is in engagement with in the present illustration. However, it should be noted that the latch 124 may be in engagement with any of the apertures of the second elongated bar member 130. The length of the connecting bar 100 may be adjusted by changing which aperture the latch 124 is in engagement with.

In the first state, the latch 124 may be in engagement with an aperture 120 of the second elongated bar member 130. More particular, a portion of the latch 124 may be present in the aperture 120 to physically engage with side walls of the aperture 120. The latch 124 may comprise a protruding top part 152. The protruding top part 152 may extend through the aperture 120 when the latch 124 is in engagement with the aperture 120. The protruding top part 152 may comprise a first side arranged towards the first distal end 108*a* of the first elongated bar member 112. The protruding top part 152 may further comprise a second side arranged towards the first proximal end 108*b* of the first elongated bar member 112. The first side may be a substantially straight side. The wording "substantially straight" may be interpreted as the side being a flat or vertical side as seen from a bottom up direction in the side-view of FIG. 3A. In contrast, the second side may be a ramp side. In other words, the first side may be configured to engage with the aperture 120 of the second elongated bar member 130 in a secure way such that the latch 124 is not pushed downwards if a force trying to pull apart the first elongated bar member 112 and the second elongated bar member 130 is applied. In contrast, the second side (or ramp side) may be configured to allow the aperture 120 of the second elongated bar member 130 to both hold the second elongated bar member 130 in place (relative the first elongated bar member 112) and allow the connecting bar 100 to retract (given that the latch 124 is free to rotate). Thus, the ramp side may allow the aperture 120 to slide over the latch 124.

In addition to the latch 124 being in engagement with the aperture 120, the latch 124, in the first state, may also be prevented from rotating by the pin element 126 of the actuation member 116. More specifically, the latch 124 may be prevented from disengaging with the aperture 120. In the first state, the actuation member 116 may be in a middle position. In this position, the pin element 126 of the actuation member 116 may be positioned at a point under the latch 124 to thereby prevent the latch 124 from rotating, as seen in the side-view of FIG. 3A. More specifically, the latch 124 in the first state may be prevented from rotating in a first direction (herein counter clockwise) by the pin element 126. Further, the latch 124 may be prevented from rotating in a second direction (herein clockwise) by the stopping member 148. Hence, in the first state, the latch 124 is in engagement with the aperture 120 of the second elongated bar member 130, and prevented from rotating in any direction. Thus, the connecting bar 100 may be prevented from both extension and retraction.

The latch 124 being prevented from rotating may be interpreted as the latch 124 being prevented from rotating far enough to disengage with the aperture 120. Hence, a smaller rotation of the latch 124 may still be possible, as can be understood from the distance between the pin element 126 and the latch 124 in the sideview of FIG. 3A.

Figure 5:
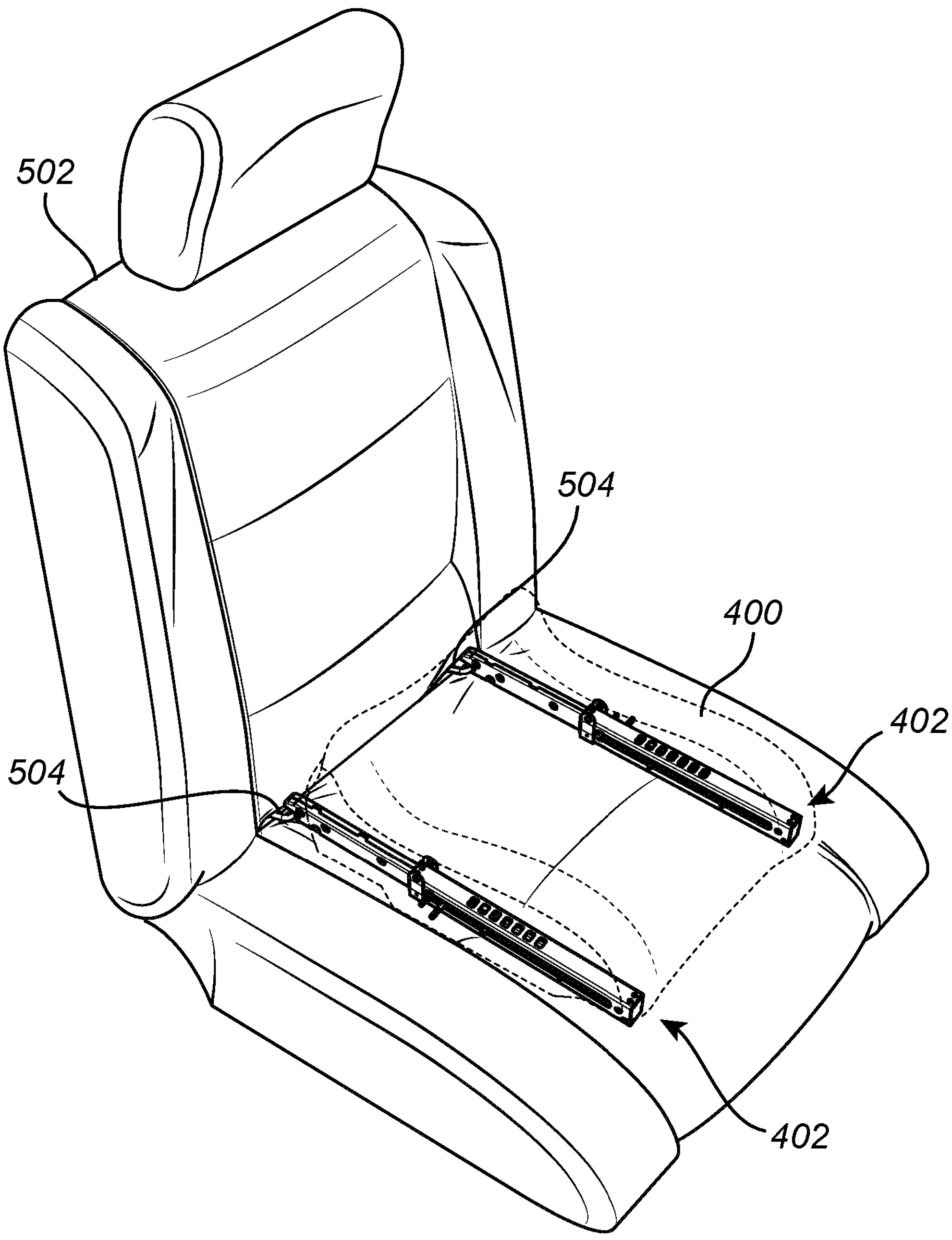
FIG. 5 is perspective view of an exemplary embodiment of a child safety seat arranged for releasable fastening to a vehicle seat according to a third aspect of the invention.

In FIG. 3B, the latch 124 is in the second state. The second state may also be referred to as a locked state. The wording "locked" herein, refers to the coupling device 104 being in the locked configuration. In this state, the hook member 106 of the coupling device 104 has rotated counter clockwise to hook onto an anchoring member 504 (as shown in FIG. 5) of the vehicle seat 502. Upon the hook member 106 rotating into the locked configuration, the locking element 142 of the actuation member 116 may engage the hook member 106, and thus, the whole actuation member 116 may move towards the first distal end 108*a* of the first elongated bar member 112. The movement of the actuation member 116 may be caused by the actuation member 116 being spring biased, or by manual movement by a user.

In the second state, the latch 124 may be in engagement with the aperture 120 as described above. Further, the latch 124 may be in engagement with the stopping member 148. Thus, extension of the connecting bar 100 may be prevented. However, since the actuation member 116 is now in a forward position (i.e., towards the first distal end 108*a* of the first elongated bar member 112), the latch 124, in the second state, is free to rotate in one direction (i.e. the first direction or the counter clock-wise direction as described above). In other words, the pin element 126 of the actuation member 116 is no longer in a position where it prevents the latch 124 from rotating counter clockwise. Thus, the connecting bar 100 is able to be retracted by pushing together the first elongated bar member 112 and the second elongated bar member 130.

When installing the connecting bar 100 in a vehicle, the second state serves the purpose of allowing the connecting bar 100 to be retracted to a desired length after the coupling device 104 has successfully connected to the anchoring members 504 of the vehicle seat 502. This facilitates for an simple installation process, since the connecting bar 100 can be in its full length when trying to connect it to the vehicle seat 502, and then retracted to the desired length upon successful installation.

In FIG. 3C, the latch 124 is in the third state. The third state may also be referred to as a release state. The wording "release" may herein refer to the connecting bar 100 being released from an anchoring member 504 of a vehicle seat 502 and/or that the latch 124 allows full adjustment of the length of the connecting bar 100. The third state may be achieved by moving the actuation member 116 to a backward position (i.e. towards the first proximal end 108*b* of the first elongated bar member 112). The actuation member 116 may be moved by a user engaging with the first protruding member 128. In the third state, the latch 124 is in engagement with the pin element 126 of the actuation member 116. More specifically, as the actuation member 116 (and thus the pin element 126) is moved towards the backward position, the pin element 126 may cause the latch 124 to rotate in a counter clockwise direction, as illustrated herein. In the example of FIG. 3C, the pin element 126 engages with a fifth slot 154 in the latch 124, thus causing the rotation of the latch 124. Hence, in the third state, the latch 124 disengages with the aperture 120 of the second elongated bar member 130 and therefore allows both extension and retraction of the connecting bar 100. As is apparent from above, the third state may be advantageous in that it allows full adjustment of the connecting bar 100.

Figure 4:
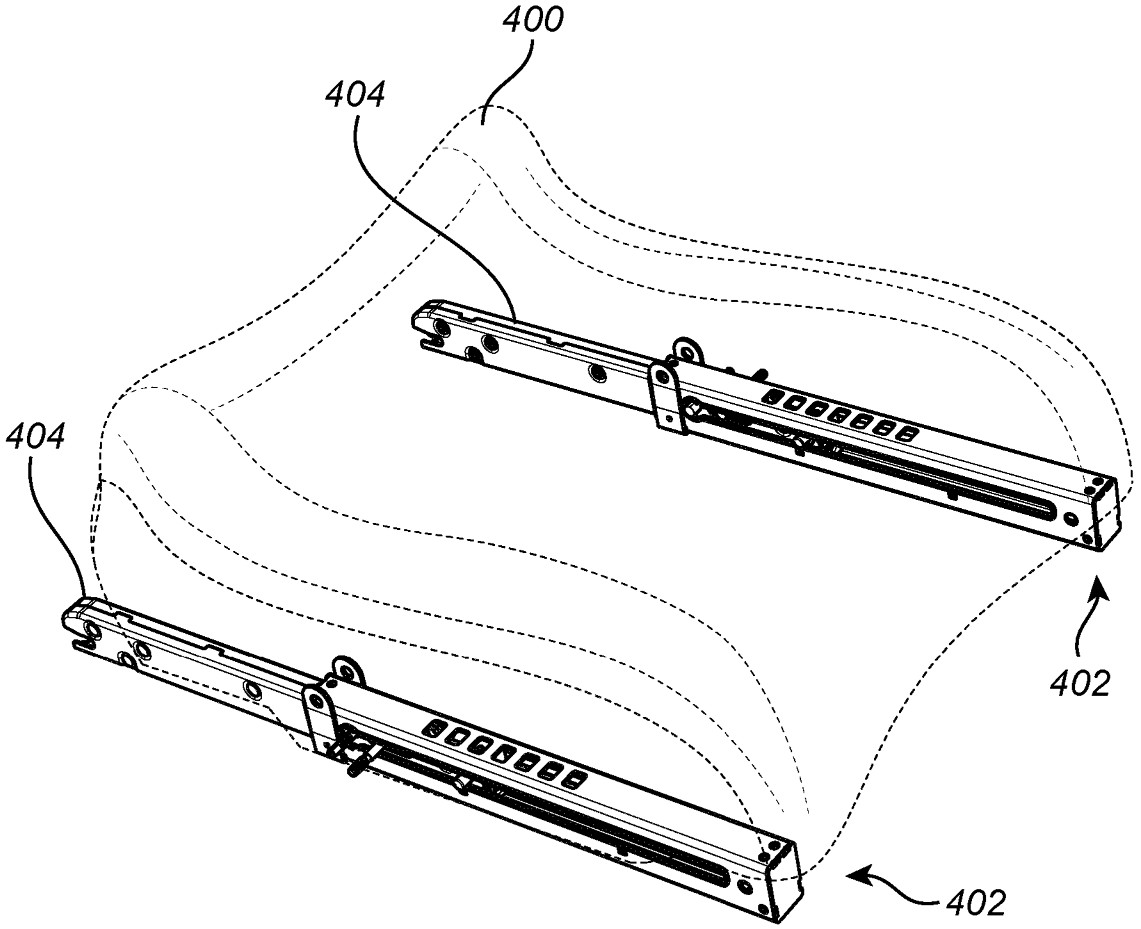
FIG. 4 is a perspective view of an exemplary embodiment of an adjustable mounting arrangement for releasable fastening of a child safety seat to a vehicle seat according to a second aspect of the invention.

FIG. 4 is a perspective view of an exemplary embodiment of an adjustable mounting arrangement 402 for releasable fastening of a child safety seat 400 to a vehicle seat according to a second aspect of the present inventive concept. The adjustable mounting arrangement 402 comprises a pair of adjustable connecting bars 404. Each adjustable connecting bar of the pair of adjustable connecting bars 404 may be a connecting bar as described above in connection with FIGS. 1A to 3C. The pair of connecting bars 404 may be operatively connected to each other via a transverse bar or any other similar arrangement. Alternatively, the adjustable mounting arrangement 402 in accordance with the present inventive concept may contain a pair of separate, non-connected connecting bars as illustrated herein.

The adjustable mounting arrangement 402 may be mounted to a child safety seat 400 as illustrated herein, to form a child safety seat 400 arranged for releasable fastening to a vehicle seat, comprising the adjustable mounting arrangement 402. Herein, the child safety seat 400 is illustrated in broken lines for illustrative purposes. The child safety seat 400 may be of different types such as cushioned seat shells having seat and back portions, booster cushions with or without side bolsters, and baby carriers. The child safety seat 400 may be attached to the adjustable mounting arrangement 402 through the seat connection points 110, 111 of the respective connecting bar.

FIG. 5 is perspective view of an exemplary embodiment of a child safety seat 400 arranged for releasable fastening to a vehicle seat 502 according to a third aspect of the present inventive concept. The child safety seat 400 (herein illustrated in broken lines for illustrative purposes) comprises an adjustable mounting arrangement 402, such as the one described above in connection with FIG. 4. In the illustrated example of FIG. 5, the child safety seat 400 is mounted to a vehicle seat 502. The child safety seat 400 is mounted to the vehicle seat 502 through the adjustable mounting arrangement 402 connected to fixedly mounted anchoring members 504 of the vehicle seat 502.

The person skilled in the art realizes that the present inventive concept by no means is limited to the preferred variants described above. On the contrary, many modifications and variations are possible within the scope of the appended claims.

Additionally, variations to the disclosed variants can be understood and effected by the skilled person in practicing the claimed invention, from a study of the drawings, the disclosure, and the appended claims.

The invention claimed is:

1. An adjustable connecting bar (100, 100') for releasable fastening of a child safety seat (400) to a vehicle seat (502) having fixedly mounted anchoring members (504), the connecting bar (100, 100') comprising:

a coupling device (104) transformable between a locked configuration and a release configuration, a first elongated bar member (112) extending along a longitudinal axis between a first distal end (108*a*) provided with the coupling device (104) and a first proximal end (108*b*), a second elongated bar member (130) extending along a longitudinal axis between a second distal end (132*a*) and a second proximal end (132*b*), wherein the first and second elongated bar members (112, 130) are telescopically interconnected and arranged for relative displacement via one or more intermediate positions between a retracted end position and an extended end position of the connecting bar (100, 100'), wherein the first elongated bar member (112) comprises an actuation member (116) movably arranged relative the first elongated bar member (112) along the longitudinal axis of the first elongated bar member (112), wherein the connecting bar (100, 100') further comprises a latch (124) being rotatably connected to the first elongated bar member (112), wherein the latch (124), in a first state, is configured to prevent both extension and retraction of the connecting bar (100, 100'), wherein the latch (124), in a second state, is configured to prevent extension and allow retraction of the connecting bar (100, 100'), wherein the latch (124), in a third state, is configured to allow both extension and retraction of the connecting bar (100, 100')

wherein the second elongated bar member (130) comprises an aperture (120), wherein the latch (124) is configured to engage with the aperture (120), wherein the actuation member (116) further comprises a pin element (126) arranged at a third proximal end (144*b*) of the actuation member (116), wherein the latch (124), in the first state, is in engagement with the aperture (120), and is prevented from rotating by the pin element (126) of the actuation member (116), wherein the latch (124), in the second state, is in engagement with the aperture (120) but free to rotate in one direction, and wherein the latch (124), in the third state, is in engagement with the pin element (126) of the actuation member (116).

2. The connecting bar (100, 100') according to claim 1, wherein the connecting bar (100, 100') comprises a plurality of apertures (120) distributed along the longitudinal axis of the second elongated bar member (130), and wherein the latch (124) is configured to engage with any one of the plurality of apertures (120).

3. The connecting bar (100) according to claim 1, wherein the latch (124) is biased by a spring to engage with the aperture(s) (120).

4. The connecting bar (100, 100') according to claim 1, wherein the coupling device (104) comprises a hook member (106) being rotatably connected to the first elongated bar member (112) to thereby be transformable between the locked configuration and the release configuration, wherein the hook member (106) is spring biased towards the release configuration.

5. The connecting bar (100, 100') according to claim 4, wherein the actuation member (116) further comprises a locking element (142), arranged at a third distal end (144*a*) of the actuation member (116), and configured to lock the coupling device (104) in the locked configuration by engagement with the hook member (106).

6. The connecting bar (100, 100') according to claim 1, wherein the latch (124) comprises a protruding top part (152) having a substantially straight side and a ramp side.

7. The connecting bar (100, 100') according to claim 1, wherein the actuation member (116) further comprises a first protruding member (128) for manually operating the actuation member (116).

8. The connecting bar (100, 100') according to claim 7, wherein the connecting bar (100, 100') further comprises a second protruding member (122) fixedly connected to the first elongated bar member (112), and wherein a distance between the second protruding member (122) and the first distal end (108*a*) of the first elongated member (112) is shorter than a distance between the first protruding member (128) and the first distal end (108*a*) of the first elongated member (112).

9. The connecting bar (100) according to claim 1, further comprising an indicator mechanism (134) operatively connected to the coupling device (104) to indicate a transformation between the locked configuration and the release configuration.

10. An adjustable mounting arrangement (402) for releasable fastening of a child safety seat (400) to a vehicle seat having fixedly mounted anchoring members, the adjustable mounting arrangement (402) comprising a pair of adjustable connecting bars (404), wherein each adjustable connecting bar is an adjustable connecting bar (100, 100') according claim 1.

11. A child safety seat (400) arranged for releasable fastening to a vehicle seat (502), the child safety seat (400) comprising an adjustable mounting arrangement (402) according to claim 10.

12. A child safety seat (400) arranged for releasable fastening to a vehicle seat (502), the child safety seat (400) comprising an adjustable mounting arrangement (402) for releasable fastening of the child safety seat (400) to a vehicle seat having fixedly mounted anchoring members, the adjustable mounting arrangement (402) comprising at least one adjustable connecting bar (100, 100') according to claim 1.

13. The child safety seat (400) according to claim 12, wherein the connecting bar (100, 100') comprises a plurality of apertures (120) distributed along the longitudinal axis of the second elongated bar member (130), and wherein the latch (124) is configured to engage with any one of the plurality of apertures (120).

14. The child safety seat (400) according to claim 12, wherein the latch (124) is biased by a spring to engage with the aperture(s) (120).

15. The child safety seat (400) according to claim 12, wherein the coupling device (104) comprises a hook member (106) being rotatably connected to the first elongated bar member (112) to thereby be transformable between the locked configuration and the release configuration, wherein the hook member (106) is spring biased towards the release configuration.

16. The child safety seat (400) according to claim 15, wherein the actuation member (116) further comprises a locking element (142), arranged at a third distal end (144*a*) of the actuation member (116), and configured to lock the coupling device (104) in the locked configuration by engagement with the hook member (106).

17. The child safety seat (400) according to claim 12, wherein the latch (124) comprises a protruding top part (152) having a substantially straight side and a ramp side.

18. The child safety seat (400) according to claim 12, wherein the actuation member (116) further comprises a first protruding member (128) for manually operating the actuation member (116).

19. The child safety seat (400) according to claim 18, wherein the connecting bar (100, 100') further comprises a second protruding member (122) fixedly connected to the first elongated bar member (112), and wherein a distance between the second protruding member (122) and the first distal end (108*a*) of the first elongated member (112) is shorter than a distance between the first protruding member (128) and the first distal end (108*a*) of the first elongated member (112).

20. The child safety seat (400) according to claim 12, further comprising an indicator mechanism (134) operatively connected to the coupling device (104) to indicate a transformation between the locked configuration and the release configuration.

* * * * *